United States Patent [19]
Yoshimura et al.

[11] Patent Number: 5,764,166
[45] Date of Patent: Jun. 9, 1998

[54] SIGNAL BINARY CODING CIRCUIT AND DIGITAL SIGNAL PROCESSING APPARATUS

[75] Inventors: Shunji Yoshimura; Toru Okazaki, both of Tokyo, Japan

[73] Assignee: Sony Corporation, Tokyo, Japan

[21] Appl. No.: 678,289

[22] Filed: Jul. 11, 1996

[30] Foreign Application Priority Data

Jul. 14, 1995 [JP] Japan .................. 7-201412

[51] Int. Cl.$^6$ .................................................. H03M 7/00
[52] U.S. Cl. .................................................. 341/58
[58] Field of Search ................ 341/58, 132; 360/67, 360/46, 65

[56] References Cited

U.S. PATENT DOCUMENTS 3,304,508  2/1967  Danielsen et al.
3,882,540  5/1975  Ottesen.
4,544,894  10/1985  Yoshida .......................... 329/122

FOREIGN PATENT DOCUMENTS

A-0 120 474  10/1984  European Pat. Off.
A-0 414 548   2/1991  European Pat. Off.

*Primary Examiner*—Brian K. Young
*Attorney, Agent, or Firm*—Frommer Lawrence & Haug LLP; William S. Frommer

[57] ABSTRACT

A signal binary coding circuit and a recording medium reproducing apparatus can binary coding efficiently the input signal sampled by the discrete time, by providing: a subtracting circuit for subtracting direct current components from the sampled value input; a comparator circuit for comparing the output value of said subtracting circuit and a threshold and outputting the binary signal based on said comparison value; an amplitude limiting circuit to amplitude-limit the output value of the subtracting circuit with the fixed value; and a direct current component forming circuit to calculate direct current components from the output value of the amplitude limiting circuit.

34 Claims, 13 Drawing Sheets

| | |
|---|---|
| SAMPLING FREQUENCY | 44.1 KHz |
| QUANTIZATION NUMBER | 16BIT (STRAIGHT LINE) |
| MODULATION SYSTEM | EFM |
| CHANNEL BIT RATE | 4.3218 Mb/s |
| ERROR CORRECTION SYSTEM | CIRC |
| DATA TRANSMISSION RATE | 2.034 Mb/s |
FIG. 1 (RELATED ART)
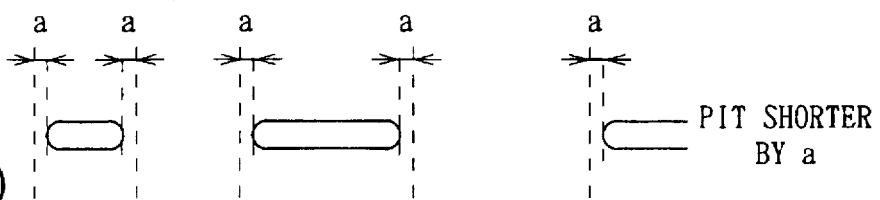
FIG. 7A (RELATED ART) — PIT SHORTER BY a
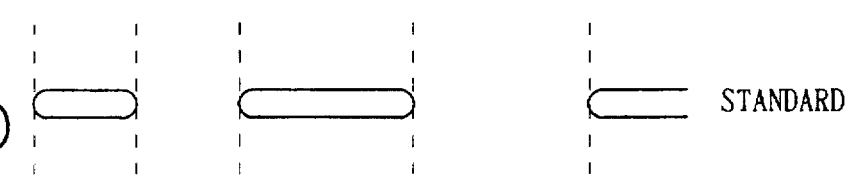
FIG. 7B (RELATED ART) — STANDARD
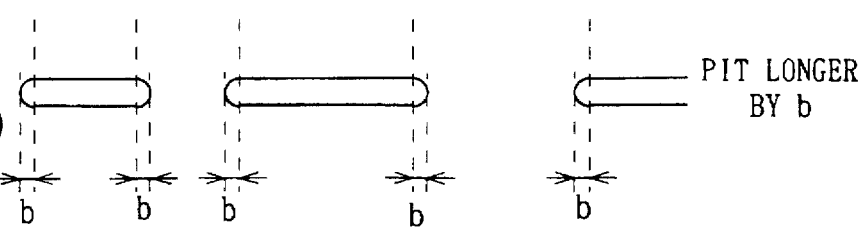
FIG. 7C (RELATED ART) — PIT LONGER BY b

SIGNAL BINARY CODING CIRCUIT AND DIGITAL SIGNAL PROCESSING APPARATUS

BACKGROUND OF THE INVENTION

1. FIELD OF THE INVENTION

This invention relates to a signal binary coding circuit and digital signal processing apparatus and more particularly, is applicable to a reproducing apparatus of a compact disc (hereinafter, referred to as CD) for binary coding a reproduction signal.

2. DESCRIPTION OF THE RELATED ART

Heretofore, in the recording of such as digital audio, video and data, the digital signal, after being added an error detection correction code, is supplied to a modulation circuit and converted to a code suited for the characteristic of recording and reproducing system (channel coding).

More specifically, an outline of the signal format of the CD system is shown in FIG. 1 in which eight to fourteen modulation (hereinafter, referred to as EFM) is used as the modulation system. The EFM is a modulation system to modulate 8 bit code (symbol) to be inputted to 14 channel bit code, and after adding 24 channel bit synchronizing signal and 14 channel bit sub-code, to connect these codes by margin bit of 3 channel bit and to NRZI record.

FIG. 2 shows the frame construction of a CD system. As shown in Fig., in 1 sync frame (6 sampled value section, 6 sample each in L and R channels, 1 sample is 16 bit data), 24 symbol data (music signal) and 8 symbol parity to be inputted from the CIRC (cross interleave Reed-Solomon code) encoder to the modulation circuit will be converted to 14 channel bit respectively and connected by margin bit of 3 channel bit, and will be made to 588 channel bit per one frame and NRZI recorded on the CD by 4.3218 [Mbps] channel bit.

Each symbol to be inputted to the modulation circuit is respectively converted to the channel bit pattern having the number of "0" between "1" and "1" is more than 2 and less than 10, referring to a look up table ROM for example. The channel bit pattern of a frame synchronizing signal Sf is "100000000001000000000010" and one of "000", "001", "010" and "100" will be chosen as the margin bit pattern. One sub-coding frame is formed by 98 frames and sub-code sync signals S0 (="00100000000001") and S1 (="0000000010010") will be added as the 0th and the 1st frame sub-codes (FIG. 3).

In regard to one example of the sampled value, FIG. 4 shows a channel bit pattern and digital sum variation (DSV) after EFM is conducted. One sample of 16 bits is divided into the upper stage 8 bits and the lower stage 8 bits and input to the modulation circuit through the CIRC encoder and after being 8 to 14 converted will be made as an information bit. And numbers of "0" more than 2 and less than 10 exist between "1" and "1" of the information bit. As the margin bit, one out of "000", "001", "010" and "100" is selected and regarding the connecting point of information bits, the same rule as described above should exist always and an EFM signal having 17 channel bits per unit (provided, the frame synchronizing signal Sf is 27 channel bits) will be outputted from the modulation circuit with 4.3218 [Mbps].

Accordingly, since numbers of channel bit "0" more than 2 and less than 10 numbers of channel bit "0" exist between an optional channel bit "1" and the following channel bit "1", the duration period (recording wavelength) of high level or low level of NRZI recording waveform is always more than 3T and less than 11T (FIG. 4). In this case, the shortest recording wavelength is 3T and the longest recording wavelength is 11T. "T" is a period of channel clock 4.3218 [MHz] and hereinafter referred to as EFM.3T to 11T rule.

Now, the DSV will be considered as an index of DC balance of NRZI recording waveform. The DSV is provided as time integration of the recording waveform. More specifically, The DSV change when the high level of recording waveform is continued for the unit time T is taken as +1 and the DSV change when the low level is continued for the unit time T is taken as −1.

The changes of the DSV time in case of assuming that the initial value of DSV at the time $t_0$ is zero is shown at the bottom of FIG. 4. The modulation signal in the period $t_1$ to $t_2$ will not be determined unconditionally by 17 channel bit pattern "01000001000001001" but will depend on the modulation signal level at the time t1, i.e., the final level (hereinafter, referred to as CWLL) of modulation signal waveform at the period $t_0$ to $t_1$.

Accordingly, the modulation signal waveform shown in Fig. is the case where CWLL is a low level (CWLL="0") at the time $t_0$, and the modulation signal waveform in the case where CWLL="1" (high level) at the time $t_0$ will become the reversed pattern replacing the high level with the low level.

Similarly, an increase and decrease of DSV will depend on CWLL and when CWLL="0" at the time $t_0$, the changes of DSV by the information bit pattern "01000100100010" (14 NWD), i.e., the changes of DSV at the period $t_0$ to $t_{0+14}$ will be +2 as shown in Fig. Contrary to the Fig., if CWLL="1" at the time $t_0$, the change will become 14 NWD=−2. Also, the change of DSV at the period $t_{0+14}$ to $t_{1+14}$ will be called 17 NWD.

Then, the margin bit to be inserted to the period $t_{0+14}$ to $t_1$ will be described as follows. Of 4 kinds of margin bits "000", "001", "010" and "100", "001" and "100" cannot be inserted according to EFM.3T to 11T rule, but "010" or "000" can be inserted. More specifically, if the number of "0"s at the end of the previous information bit pattern to be outputted before margin bit will be "B", and the number of "0"s at the top of the present information bit pattern to be outputted later is taken to be "A", B=a1 and A=a1 exist, and accordingly the top of the margin bit must be "0" and the end must be "0", and the margin bit pattern which can be inserted will become "0x0".

In FIG. 4, the DSV when "010" is inserted as the margin bit is shown by a solid line and when "000" is inserted is shown by a broken line. Generally, in the case of inserting the margin bit at some connection point, the margin bit which satisfies the EFM. 3T to 11T rule must be selected. Moreover, an occurrence of the repeated pattern of 11T which is the same as the frame synchronization pattern must be prevented.

In the case where the margin bits to satisfy these rules are inserted respectively, the accumulated DSV from the margin bit to the end of the following information bit pattern in addition to the accumulated DSV so far will be obtained and the one whose absolute value becomes the minimum value will be selected as the most suitable margin bit.

Regarding the margin bit thus obtained by these algorithms, the EFM.3T to 11T rule also exists at the connection point of two 14 bit data and the erroneous generation of frame sync signal is prevented, the accumulated DSV of EFM signal can be brought very close to zero.

In the case where the signal contains direct current components, since the integrated value of signal waveform, i.e., the accumulated DSV develops to positive or negative infinity, in general the accumulated DSV is very close to zero meaning that the direct current component of modulation signal waveform is zero.

In practice, in the signal thus modulated according to the system described above, such as "1" is recorded corresponding to pit (recording area) and "0" is recorded corresponding to mirror (unrecord area) on the CD. In the recording signal, since only the position at which signal level reverses is modulated to the NRZI form having information, the lengths of pit and mirror are very important but it does not matter if the corresponding relationship between the signal level and pit/mirror were reversed. That is, "0" recorded corresponding to the pit (recording area) and "1" recorded corresponding to the mirror (unrecord area) can be considered the same.

Then, the construction of an optical disc reproducing apparatus for reproducing optical disc (CD) recorded as described above will be shown in FIG. 5. The optical disc reproducing apparatus 1 has a reproduction signal binary coding circuit 2. An optical pickup 3 emits the flux of light and inputs the return light in order to convert the incident light to electric signal. The signal obtained at the optical pickup 3 is input to an input terminal 6 of the signal binary coding circuit 2 via an amplifier 5. And hereinafter this signal is referred to as reproduction RF signal S1. Also, aside from this signal, signal S2 from the optical pickup 3 is input to a servo circuit 7, in order to determine the position of lenses, or the like, of the optical pickup 3 and control the rotation of spindle motor 8.

Reproduction RF signal S1 to be input to the reproduction signal binary coding circuit 2 is input to the positive input terminal of a voltage comparator 9. The voltage comparator 9 compares the magnitude of voltages inputted to the positive input terminal and the negative input terminal respectively, and in the case where the voltage of the positive input terminal is larger, outputs +5 [V] as the high level and, in the case where the voltage of the negative input terminal is larger, outputs 0 [V] as the low level. Output signal of integrator 10 is inputted to the negative input terminal of the voltage comparator 9. That is, the voltage comparator 9 binary codes the reproduction RF signal S1 to +5 [V] and 0 [V] using the output of the integrator 10 as the threshold.

The output signal of the voltage comparator 9 is supplied to the subtracter 11 and simultaneously output to PLL circuit 13 and ECC signal processing 14 of the demodulation circuit via the output terminal 12.

The subtracter 11 subtracts the base voltage from the output of the voltage comparator 9. The mean voltage (+2.5 [V]) between high level and low level of the output of the voltage comparator 9 is used as the base voltage. The integrator 10 integrates the output of subtracter 11 and supplies the output to the negative input terminal of the voltage comparator 9.

The operation of thus constructed reproduction signal binary coding circuit 2 will be described below. In the case of recording signals shown in FIG. 6A on the CD, pits as shown in FIG. 6B are recorded on the disc. At this time, the reproduction signal becomes the waveform as shown in FIG. 6C for example. In the reproduction signal binary coding circuit 2 in FIG. 5, by binary coding the reproduction signal using the voltage comparator 9, the NRZI recording waveform can be reproduced. Here, the low level corresponds to pit and the high level corresponds to mirror. The corresponding relationship is opposite to the relationship of recording time described above. However, the corresponding relationship inversion between the level and pit/mirror would not cause any problem, but only the reproduction of correct length of each is very important.

In FIG. 5, since the output of integrator 10 is used as the threshold for binary coding, if the output value were the value shown with a, b, c in FIG. 6C, the output signal (binary signal) from the voltage comparator 11 at each output value becomes is shown in a', b' and c' of FIG. 6D. The threshold "b" is the optimum threshold and lengths of low level and high level can be reproduced correctly. On the other hand, the threshold "a" is higher threshold than the optimum threshold and the length of high level is reproduced shorter than the original and the length of low level is reproduced longer than the original. Moreover, the threshold "c" is lower than the optimum value and the length of high level is reproduced longer than the original and the length of low level is reproduced shorter than the original.

Moreover, in FIG. 6A, the sum of the length of low level and the sum of the length of high level between $t_0$ and $t_1$ are equally 8T. At this point, by subtracting the base voltage 2.5 [V] from the output waveform of the voltage comparator 9 at the subtracter 11 in FIG. 5. Thereby, the high level is corresponded with +2.5 [V] voltage and the low level is corresponded with −2.5 [V] voltage. This waveform is integrated by the integrator 10.

As regards to the waveform obtained by the optimum threshold "b", the integrated value between $t_0$ to $t_1$ is 0 [V] and accordingly the integrated value at $t_1$ does not change from the integrated value at $t_0$. Similarly, as for the waveform obtained by the threshold "a" which is higher than the optimum value, the integrated value at $t_1$ decreases from the integrated value at $t_0$. Also, as for the waveform obtained by the threshold "c" which is lower than the optimum value, the integrated value at $t_1$ increases from the integrated value at $t_0$.

In order to simplify the explanation, a diagram, in which thresholds to be given to the voltage comparator at $t_0$ to $t_1$ are constant, is shown. However, in practice, the integrated values thus obtained will become the threshold of the voltage comparator 9 moment by moment. More specifically, in the system wherein the sums of lengths of the low level and high level become equal, when the threshold given to the voltage comparator 9 by the integrator 10 is too high, it decreases automatically, and if the threshold is too low, it increases automatically. Accordingly, finally the binary coding will be conducted with the optimum threshold.

On the other hand, the EFM controls the accumulated DSV so as to be brought to zero as close as possible by selecting margin bit. Accordingly, in the case where the system adopts the FEM, said system (in which sums of lengths of low level and high level are equal) is valid automatically.

In the case of the CD, a recording signal is recorded on the master by, for example, the mastering device to form on the disc through metal master, mother, stamper, and the like. In this case, sizes of pits to be formed on the disc vary due to the condition of mastering device and master. This is called asymmetry. It is known that in many cases asymmetry has the same effect on all pits having various lengths in the direction of pit width, and it affects the same amount on front and back for all pits having various lengths in the direction of pit length (FIG. 7A to 7C).

As it is clear from the operational principle described above, the binary coding circuit provides the correct optimal threshold even if asymmetry exists. More specifically, the binary coding circuit corrects the physical difference of pits and mirror lengths on the disc due to the asymmetry and the binary coding will be executed with the threshold so that the correct lengths of high level and low level of the signal which is supposed to be recorded originally can be obtained.

Hereupon, in the reproduction signal binary coding circuit described above, generally the reproduction signal processing circuit such as discs, circuit digitalization will be conducted in order to simplify the adjustment and to realize highly integrated device. In this case, reproduction signal is sampled by the discrete time and the sampled value will be processed. This also applies to the reproduction signal binary coding circuit.

However, if the signal binary coding circuit were merely replated by the discrete time system, the circuit described above detects the threshold difference as a deviation of binary waveform edge in the time base direction. However, since its resolution becomes the sampling period, there occurs a dead band in case of detecting the threshold difference. Especially in the system of which sampling frequency is not large enough for the modulated channel clock frequency, the precise threshold control for binary coding cannot be conducted.

SUMMARY OF THE INVENTION

In view of the foregoing, an object of this invention is to provide a signal binary coding circuit and a recording medium reproducing apparatus in which, an input signal sampled by the discrete time can be binary coded in accuracy.

The foregoing object and other objects of the invention have been achieved by the provision of a signal binary coding circuit which comprises: a subtracting circuit for subtracting the direct current components from the sampled value input; a comparator circuit for comparing the output value and the threshold of the subtracting circuit and outputting the binary signal corresponding to the comparison value; an amplitude limiting circuit to amplitude-limit the output value of subtracter circuit with the fixed value; and a direct current component forming circuit for calculating the direct current components from the output value of the amplitude limiting circuit.

The nature, principle and utility of the invention will become more apparent from the following detailed description when read in conjunction with the accompanying drawings in which like parts are designated by like reference numerals or characters.

BRIEF DESCRIPTION OF THE INVENTION

In the accompanying drawings:

FIG. 1 is a chart showing the signal format of the CD system;

FIGS. 7A to 7C are schematic diagrams showing the general concept of asymmetry;

DETAILED DESCRIPTION OF THE EMBODIMENT

Figure 2:
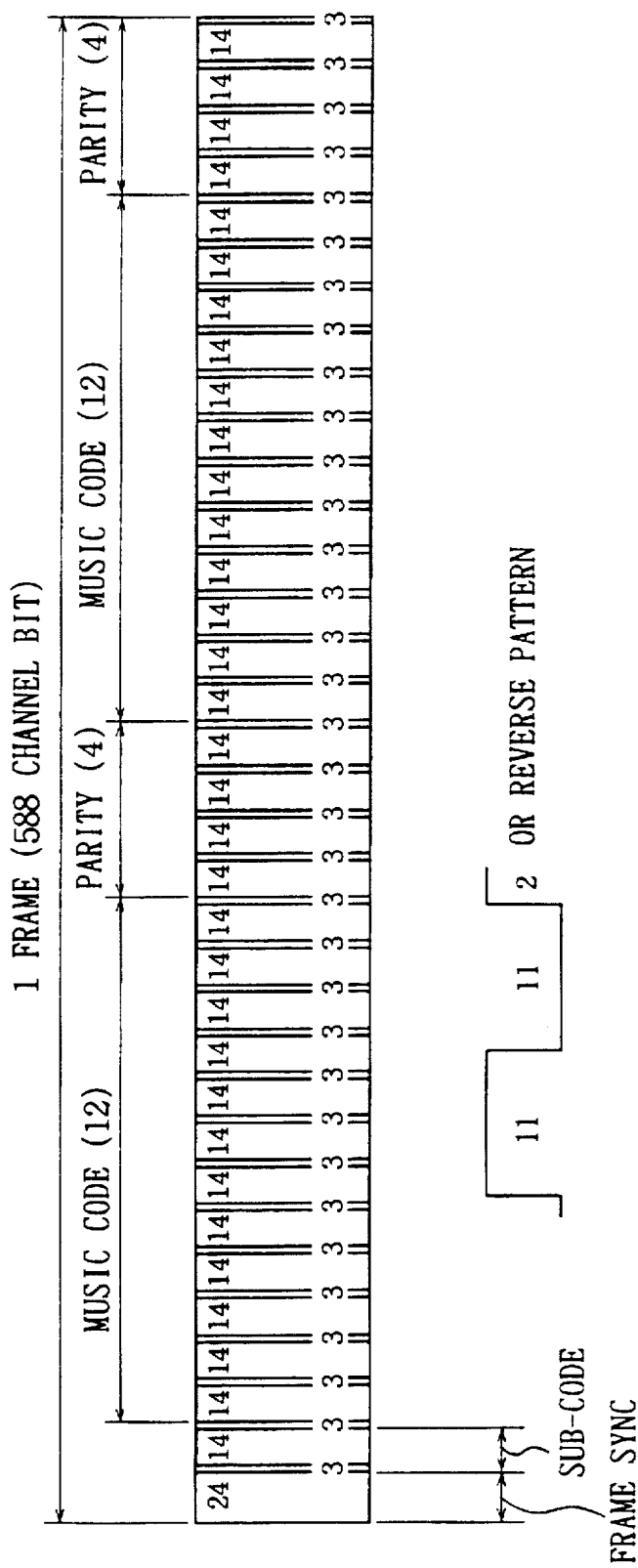
FIG. 2 is a schematic diagram showing the frame construction.
Figure 3:
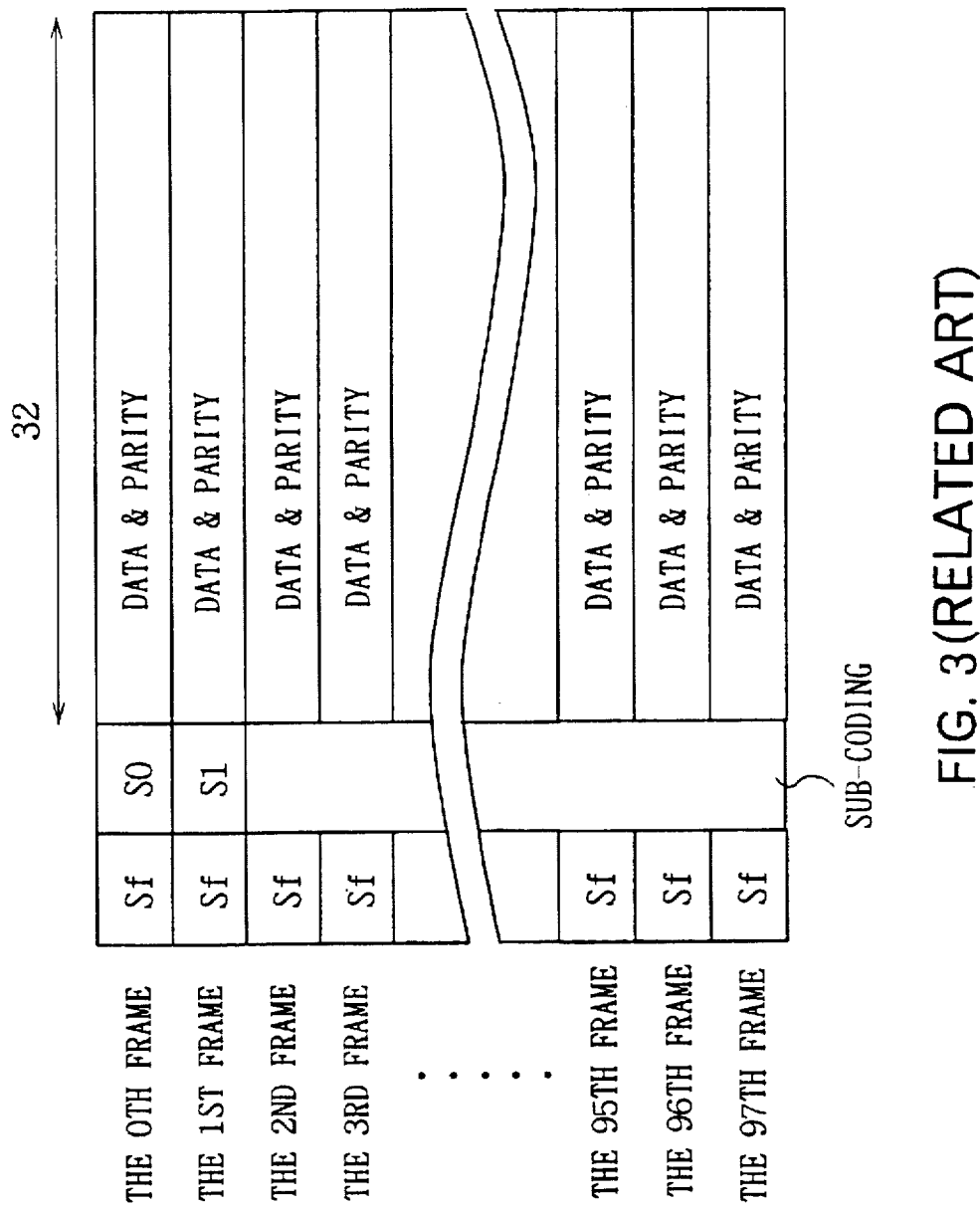
FIG. 3 is a schematic diagram showing the sub-coding frame construction.
Figure 4:
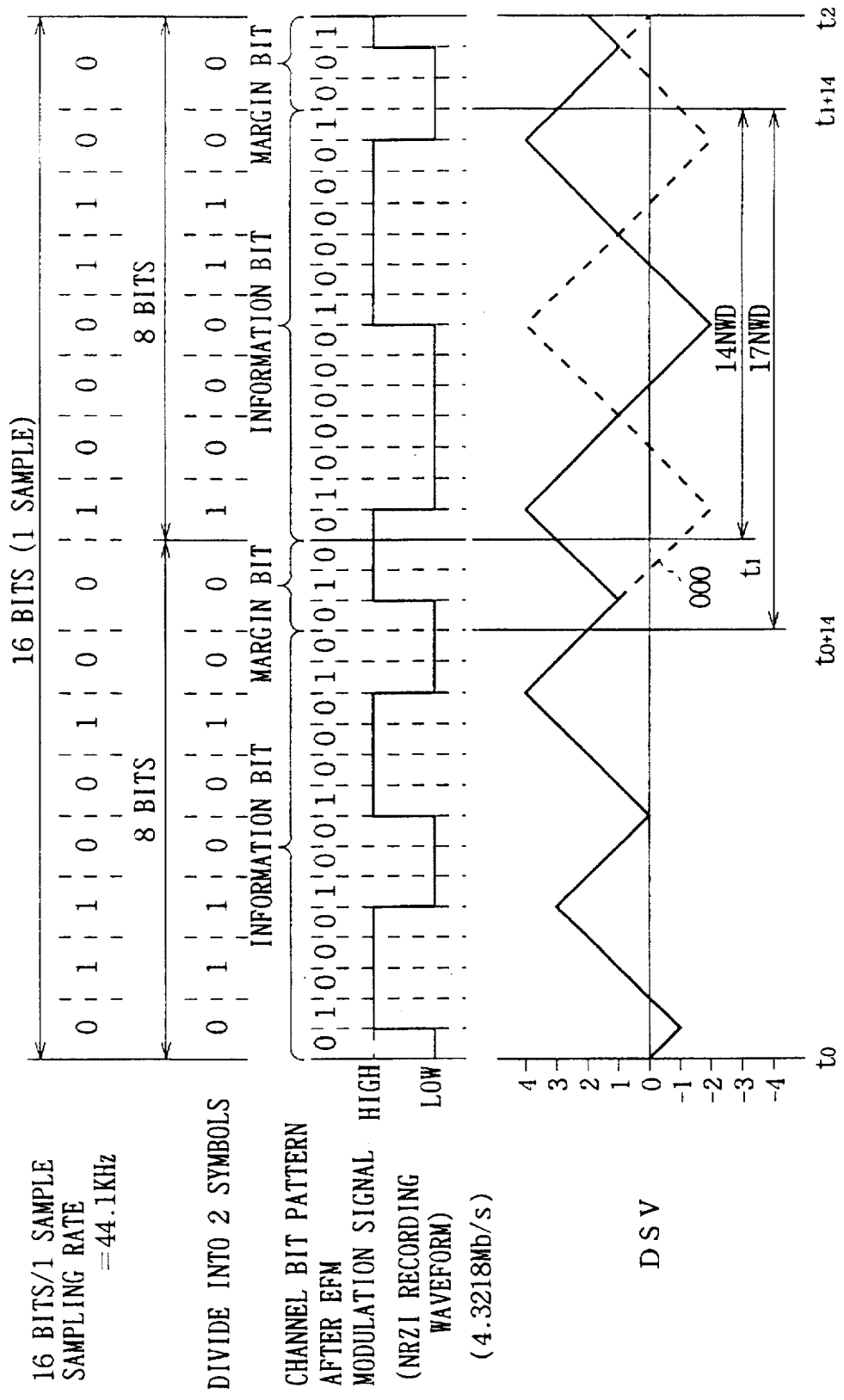
FIG. 4 is a characteristic linear diagram showing an example of sampled value, channel bit pattern after EFM and digital sum variation.
Figure 5:
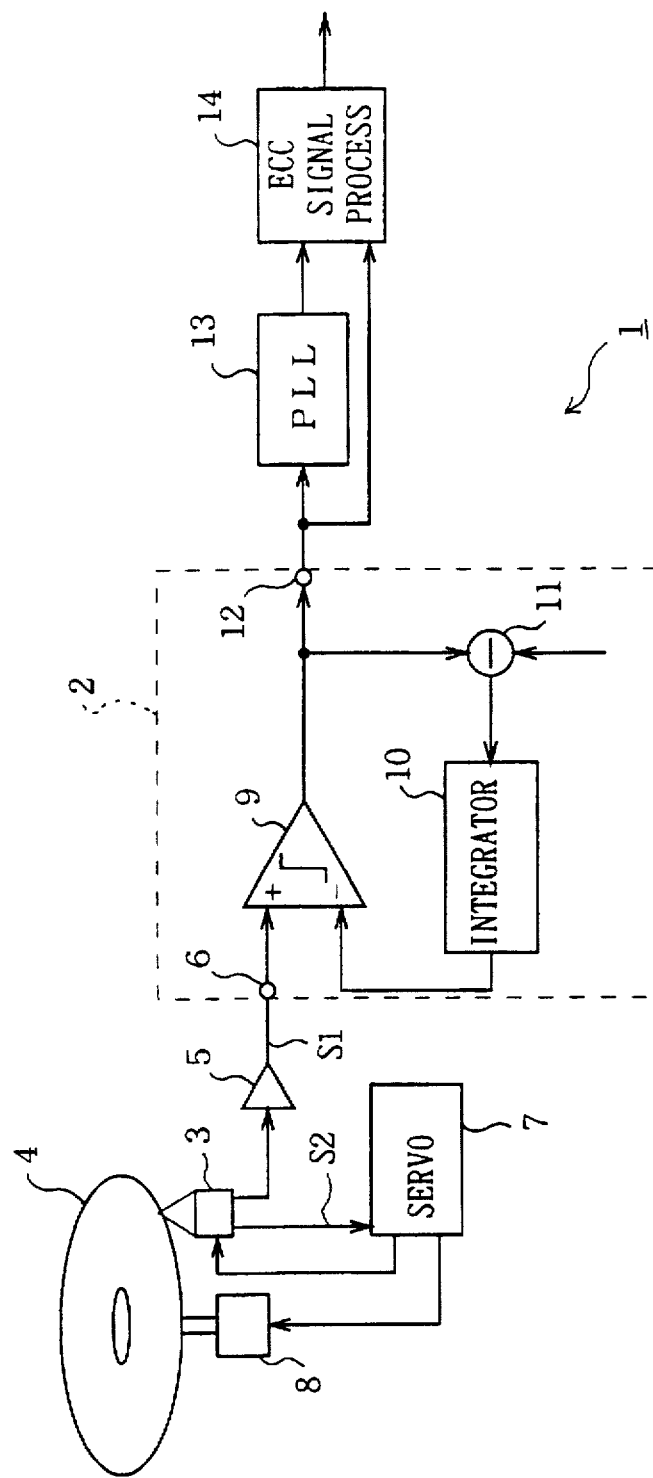
FIG. 5 is a schematic diagram showing the construction of a prior optical disc reproducing apparatus having the reproduction signal binary coding circuit.
Figure 6A:
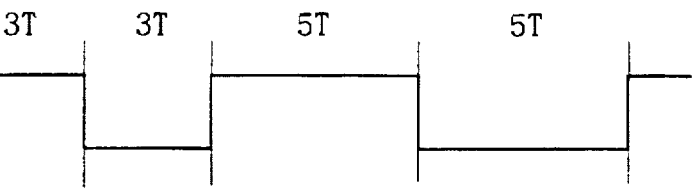
FIGS. 6A to 6D are characteristic curvilinear diagrams showing the reproduction signal waveform and the binary signal waveform.
Figure 6B:
Figure 6C:
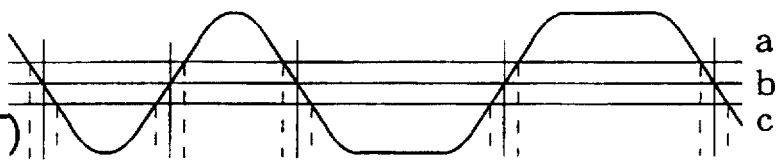
Figure 6D:
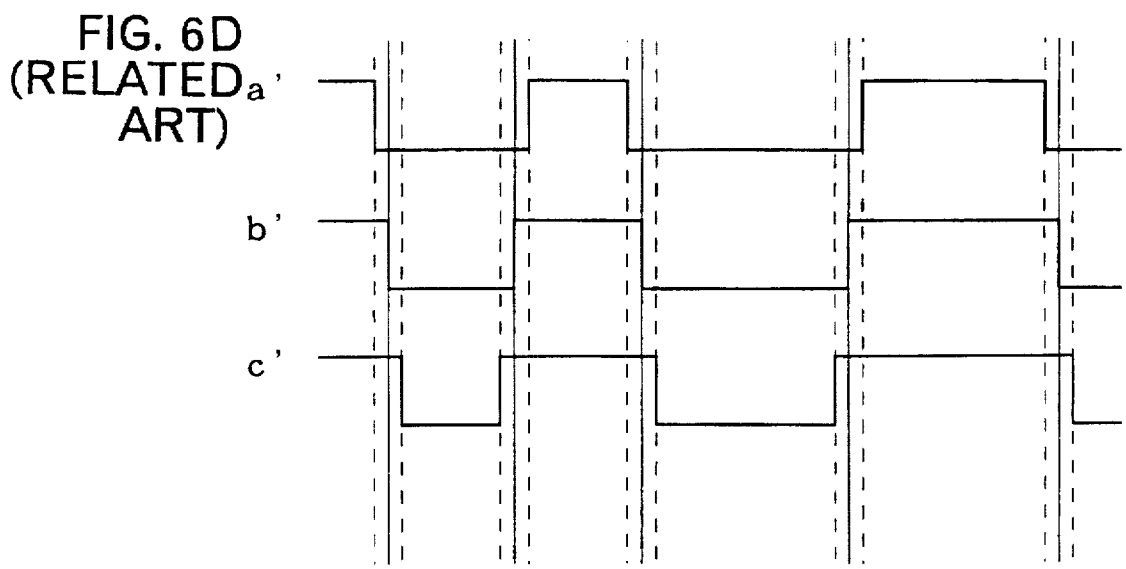
Figure 8:
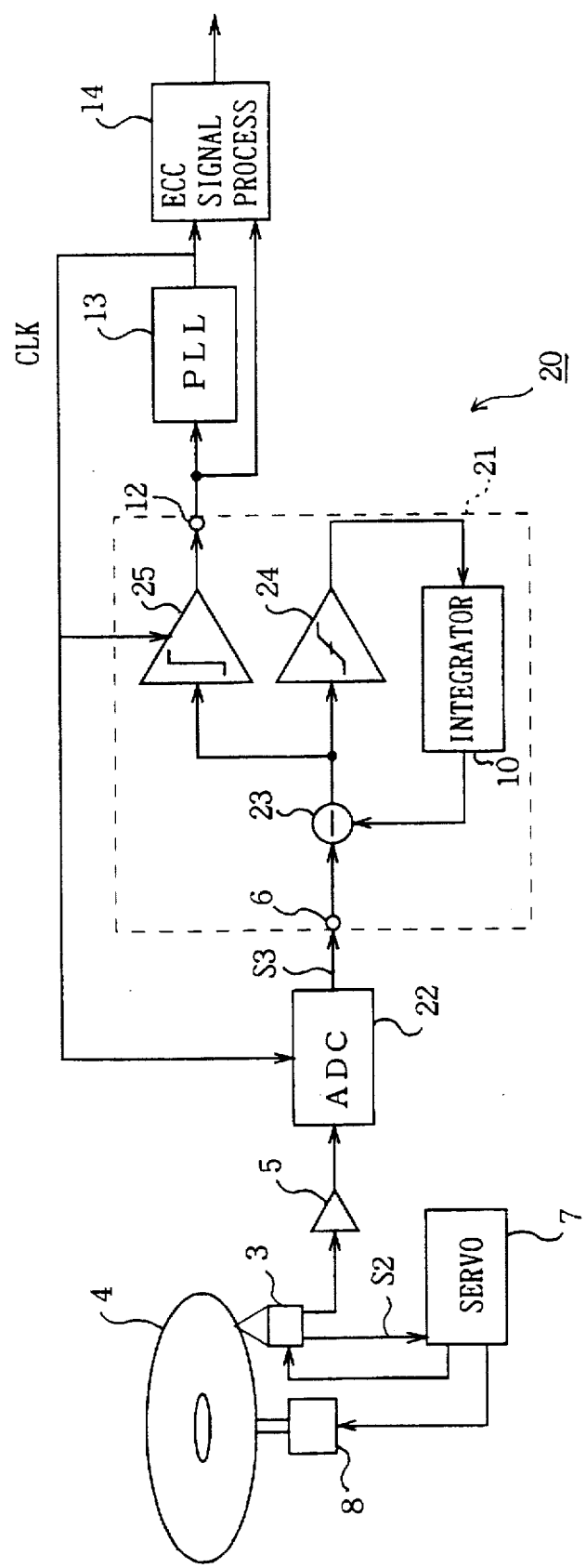
FIG. 8 is a schematic diagram showing the construction of a digital signal processing apparatus according to the present invention.

Preferred embodiments of this invention will be described with reference to the accompanying drawings:

FIG. 8, where parts corresponding to those in FIG. 5 are designated the same reference numerals, shows the construction of a digital signal processing apparatus 20 connected with the reproduction signal binary coding circuit 21 of the present invention.

An optical pickup 3 emits the flux of light to the optical disc 4 and inputs the return light in order to convert the incident light to the electric signal. The signal obtained at the optical pickup 3 is sampled by a sampling AD converter 22 with the fixed sampling frequency through an amplifier 5 and input to an input terminal 6. This input signal is taken to be reproduction RF signal S3. Moreover, aside from this signal, signal S2 from the optical pickup 3 is input to a servo circuit 7, in order to determine the position of lenses of the optical pickup 3 and to rotation control of the spindle motor 8.

The reproduction signal binary coding circuit 21 comprises a subtracter 23, an amplitude limiting circuit 24, a comparator 25, and an integrator 10.

The subtracter 23 inputs the reproduction RF signal S3 to the positive input terminal and the output from the integrator 10 to the negative input terminal respectively, and outputs the calculation result to the amplitude limiting circuit 24 and the comparator 25 respectively.

Figure 9:
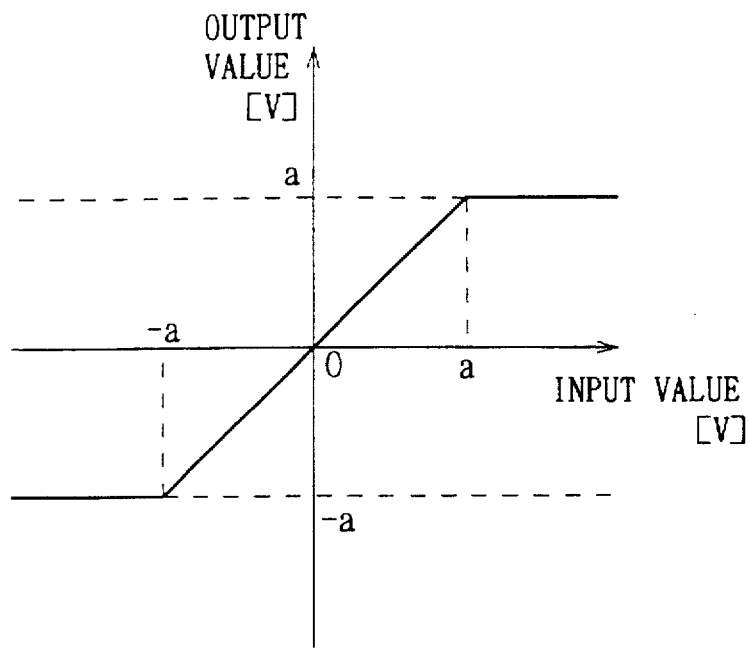
FIG. 9 is a characteristic linear diagram showing the input output characteristic of the amplitude limiting circuit.

The amplitude limiting circuit 24 is the circuit having the input-output characteristic which makes "a" as the amplitude limit value as shown in FIG. 9. The output signal of the circuit 24 is input to the negative input terminal of the subtracter 23 via the integrator 10. Moreover, the comparator 25 is the circuit which outputs 1 when the input signal is more than 0 and outputs 0 when the input signal is less than 0 for example, and binary codes the input signal making 0 as the threshold. The output signal from the comparator 25 is output to a PLL circuit 13 and an ECC signal processing 14 of the latter stage through the output terminal 12.

Figure 10:
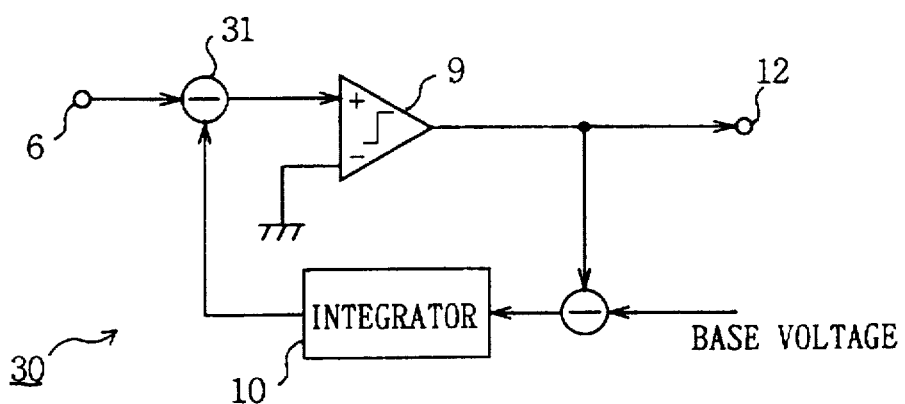
FIG. 10 is a schematic diagram showing the reproduction signal binary coding circuit according to the present invention.

According to the foregoing construction, firstly a reproduction signal binary coding circuit 30 shown in FIG. 10 will be considered before explaining the reproduction signal binary coding circuit 21 shown in FIG. 8. The reproduction signal binary coding circuit 30 sets subtracter 31 before the voltage comparator 9 of the reproduction signal binary coding circuit 2 shown in FIG. 5. The input signal from the input terminal 6 is input to the positive input terminal of the subtracter 31 and the output of the integrator 10 is input to the negative input terminal of the subtracter 31. Also, the output of the subtracter 31 is input to the positive input terminal of the voltage comparator 9 and the negative input terminal of the voltage comparator 9 is grounded.

At this point, in the reproduction signal binary coding circuit 2 shown in FIG. 5, where the reproduction RF signal of the amplifier 5 is "A", where the output from the integrator 10 is "B", the voltage comparator 9 judges whether the following equation (1) exists or not:

$$A > B \tag{1}$$

This equation (1) can be modified and expressed as the following equation (2):

$$A - B > 0 \tag{2}$$

Furthermore, in FIG. 10, under the same condition as described above, the output signal from the subtracter 31 will become A−B. Since the negative input terminal of the voltage comparator 9 is grounded, it is 0. Accordingly, equation (2) has the same definition as those of the voltage comparator 9 in FIG. 10. Thus, it is apparent that the reproduction signal binary coding circuit 30 in FIG. 10 and the reproduction signal binary coding circuit 2 in FIG. 5 function completely in the same way.

Figure 11A:
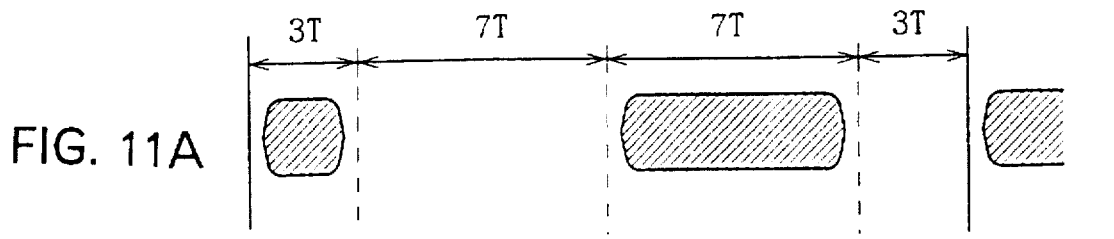
FIGS. 11A to 11C are characteristic curvilinear diagram showing the reproduction signal waveform and the amplitude limit output.
Figure 11B:
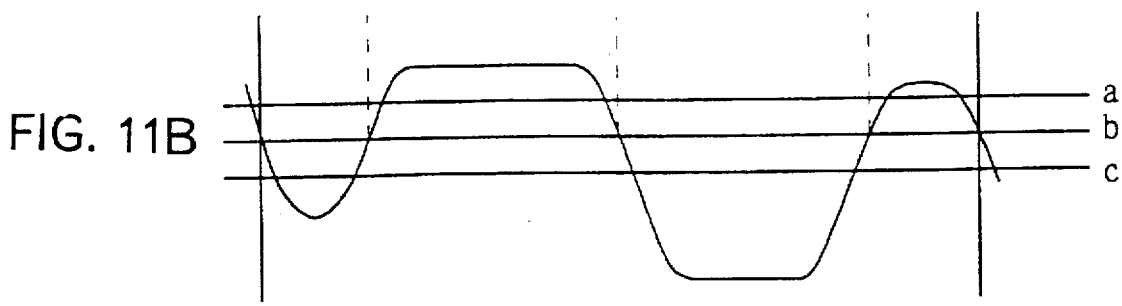

Next, the reproduction signal binary coding circuit 21 in FIG. 8 is considered a circuit in which the voltage comparator 9 of the reproduction signal binary coding circuit 30 of FIG. 10 is replaced by the amplitude limiting circuit 24. Firstly, it is provided that the input signal is continuous waveform. In the case where pits like FIG. 11A are recorded on the optical disc 4, the reproduction signal becomes such as the waveform shown in FIG. 11B. Here, the recording pattern is 3T−7T−7T−3T and assuming the asymmetry which makes pits somewhat short exists.

Figure 11C:
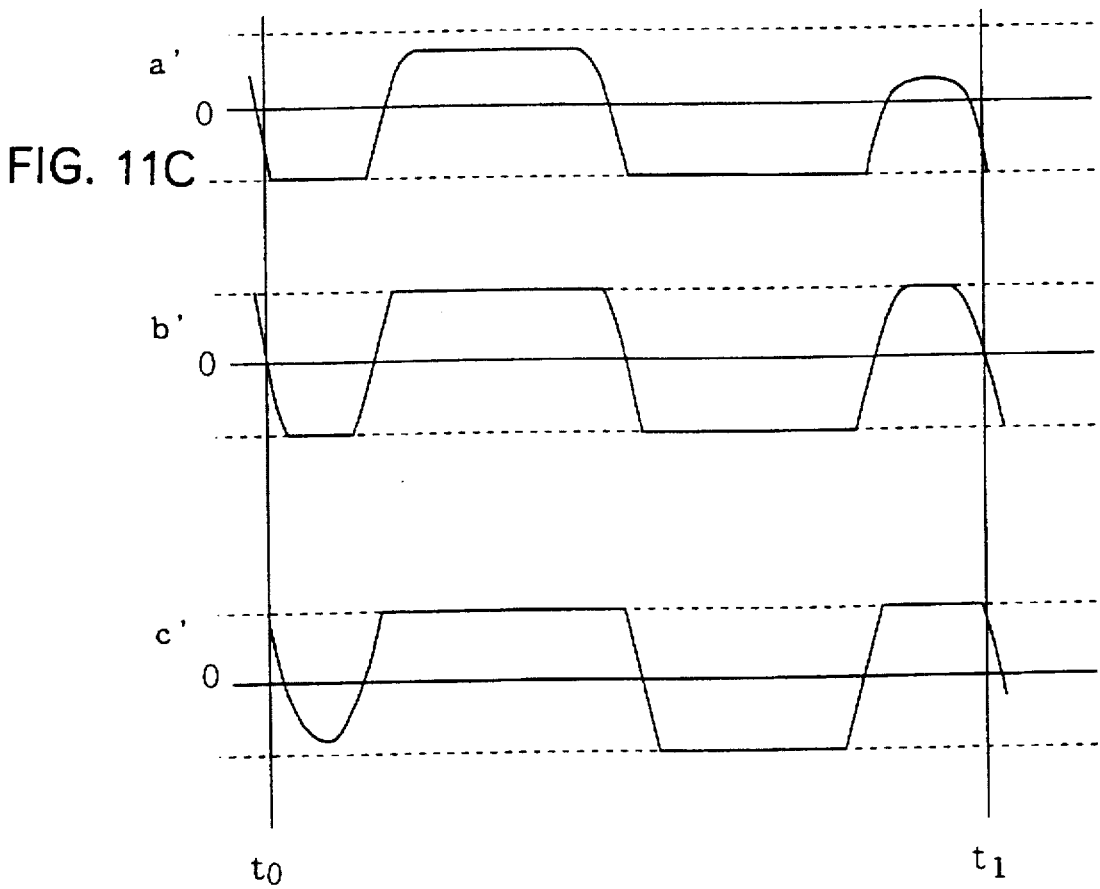

At this point, in FIG. 8, output of the integrator 10 is subtracted from the input as direct current component value. If the values were the values shown by "a", "b" and "c" in FIG. 11B, the output signal of the amplitude limiter 24 at that time would be as shown in FIG. 11C. Here, the amplitude limit values of the amplitude limiter 24 are the values shown by dashed lines in FIG. 11C. The amplitude limit values will be described later.

It is clear that the value of "b" in Fig. is the optimum value as the direct current value since the lengths of high level and low level are equal on 3T and 7T respectively in case of considering the signal upon binary coded.

Regarding the waveform obtained by the optimum direct current value "b", vertical asymmetry due to asymmetry cannot be seen in the case of amplitude-limiting by the amplitude limit value as shown by dashed lines in Fig. Consequently, the integrated value between $t_0$ to $t_1$ is 0 [V] and the integrated value at $t_1$ does not change from the integrated value at to. Similarly, as for the waveform obtained by the direct current value "a" which is higher than the optimum value, the integrated value at $t_1$ decreases from the integrated value at $t_0$, and as for the waveform obtained by the direct current value "c" which is lower than the optimum value, the integrated value at $t_1$ increases from the integrated value at $t_0$.

According to the foregoing description, the Fig. in which the direct current values to be given to the subtracter 23 at $t_0$ to $t_1$ are constant has been shown. However, in practice, thus obtained integrated value itself will become the subtracted value of the subtracter 23 moment by moment. More specifically, in the system in which the original signal waveform does not have direct current component, such as the signal modulated by EFM is input, the subtracted value given to the subtracter 23 by the integrator 10 decreases automatically when it is too high, and increases automatically when it is too low. Thus, finally the direct current components will be eliminated from output of the subtracter 23, and it can be correctly binary coded by the comparator 25.

The operation described above is approximately the same as the operation of the reproduction signal binary coding circuit 30 in FIG. 10 so far as considering according to the duration time system. However, the input signal in the vicinity of polarity inversion to the integrator 10 differs from the operation described above in the case where the reproduction signal binary coding circuit 30 in FIG. 10 is applied to the discrete time system.

Figure 13:
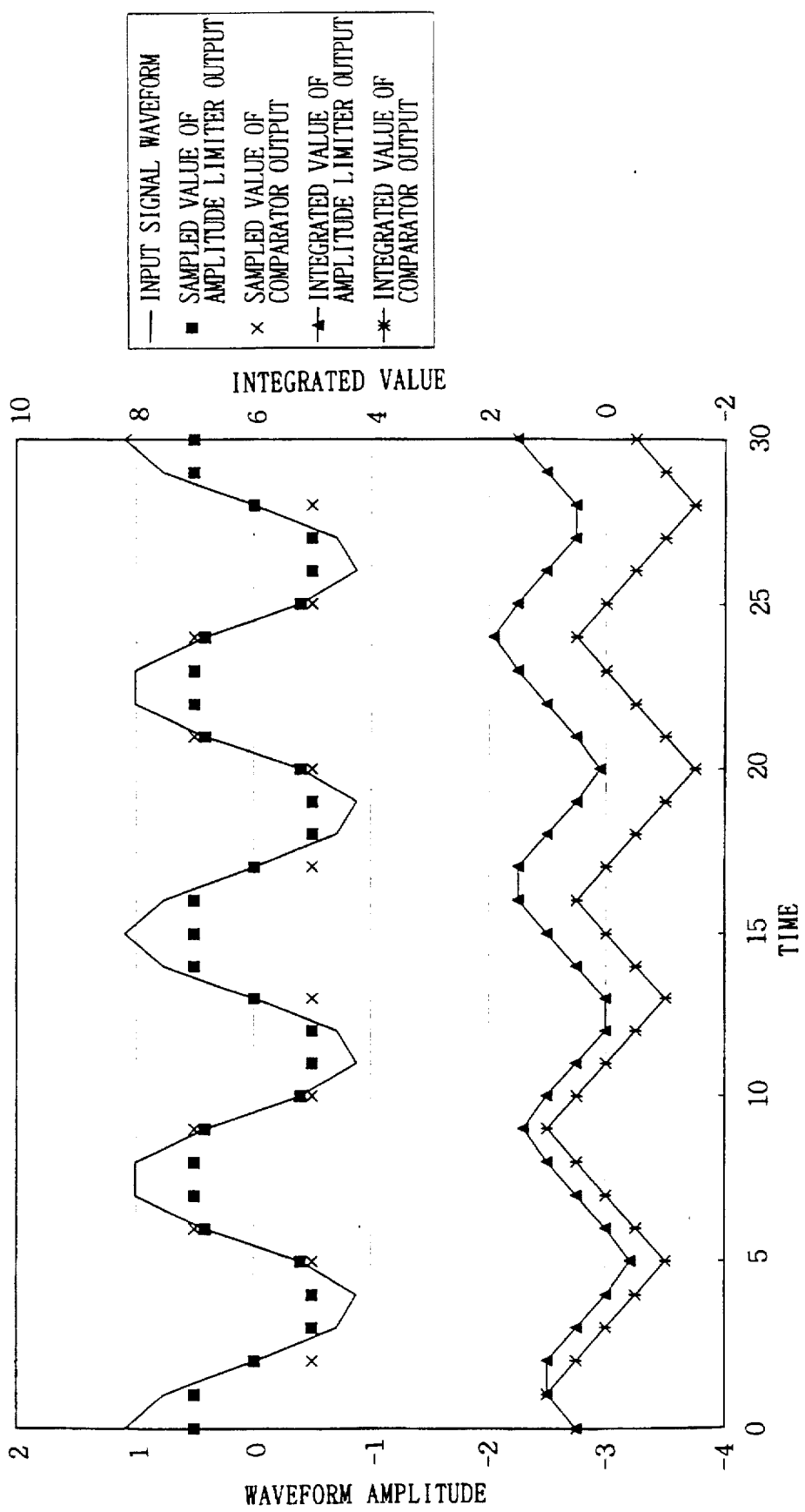
FIG. 13 is a characteristic curvilinear diagram showing the difference between the behavior of the reproduction signal binary coding circuits 20 and 30 on the discrete time system.

FIG. 13 is an example for explaining the difference of the behavior between the reproduction signal binary coding circuit 20 in FIG. 8 and the reproduction signal binary coding circuit 30 in FIG. 10 on the discrete time system. The waveform shown as the input signal waveform is a polygonal line in which the signal "y", shown by the following equation (3), sampled by the sampling period 1 is linked by a straight line:

$$y = \cos(2\pi \cdot t/T) + Vo \tag{3}$$

In the equation (3), it is assumed that "t" is a time, "T" is a period, and "Vo" is an offset voltage. And "T" equals 7.5, and "Vo" equals 0.1.

Also, the signal which is amplitude-limited to amplitude 0.5 is shown as a sampled value of an amplitude limiter output, and the signal which is binary-coded, in which amplitude is 0.5, is shown as a sampled value of a comparator output. Further, the values which those values are integrated are shown as an integrated value of the output of the amplitude limiter and an integrated value of the output of the comparator respectively. These integrated values, in the signal binary coding circuits 20 and 30, correspond to the output voltage of the integrator 10 in the case where the output of the integrator 10 is separated from the subtracters 23 and 31.

As it is clear from FIG. 13, in the case of integrating the output of the amplitude limiter, the integrated value increases gradually with vibrant by reflecting the positive offset value. On the contrary, in the case of integrating the output of the comparator, the integrated value decreases in reverse to the polarity of the offset. That is, it means that if the signal binary coding circuit is formed by connecting these integrated values to the subtracters 23 and 31, the threshold is correctly controlled in the case of using the amplitude limiter, but the threshold is not correctly controlled in the case of using the comparator.

Figure 14:
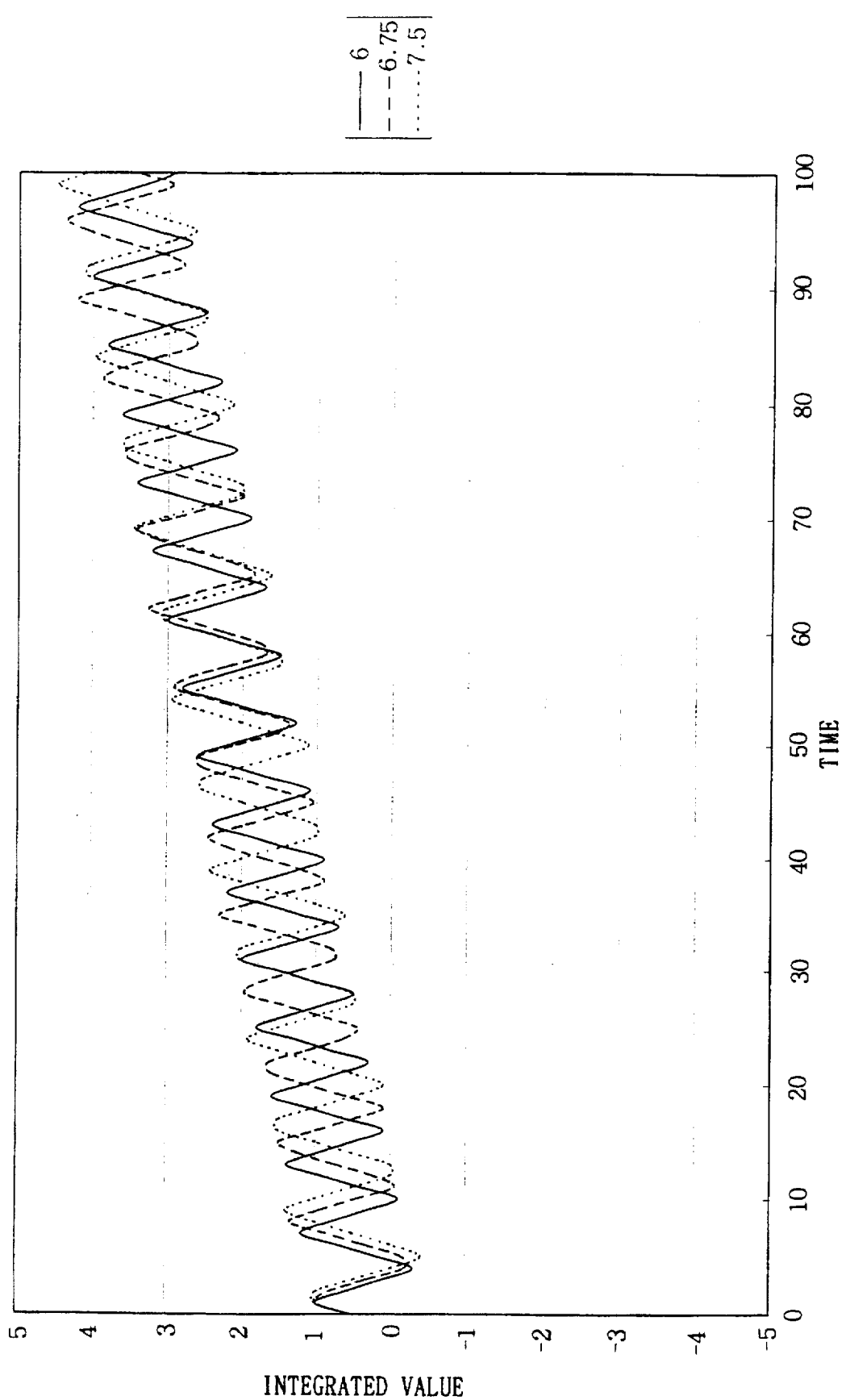
FIG. 14 is a characteristic curvilinear diagram showing the integrated value in the case of using the amplitude limiter.
Figure 15:
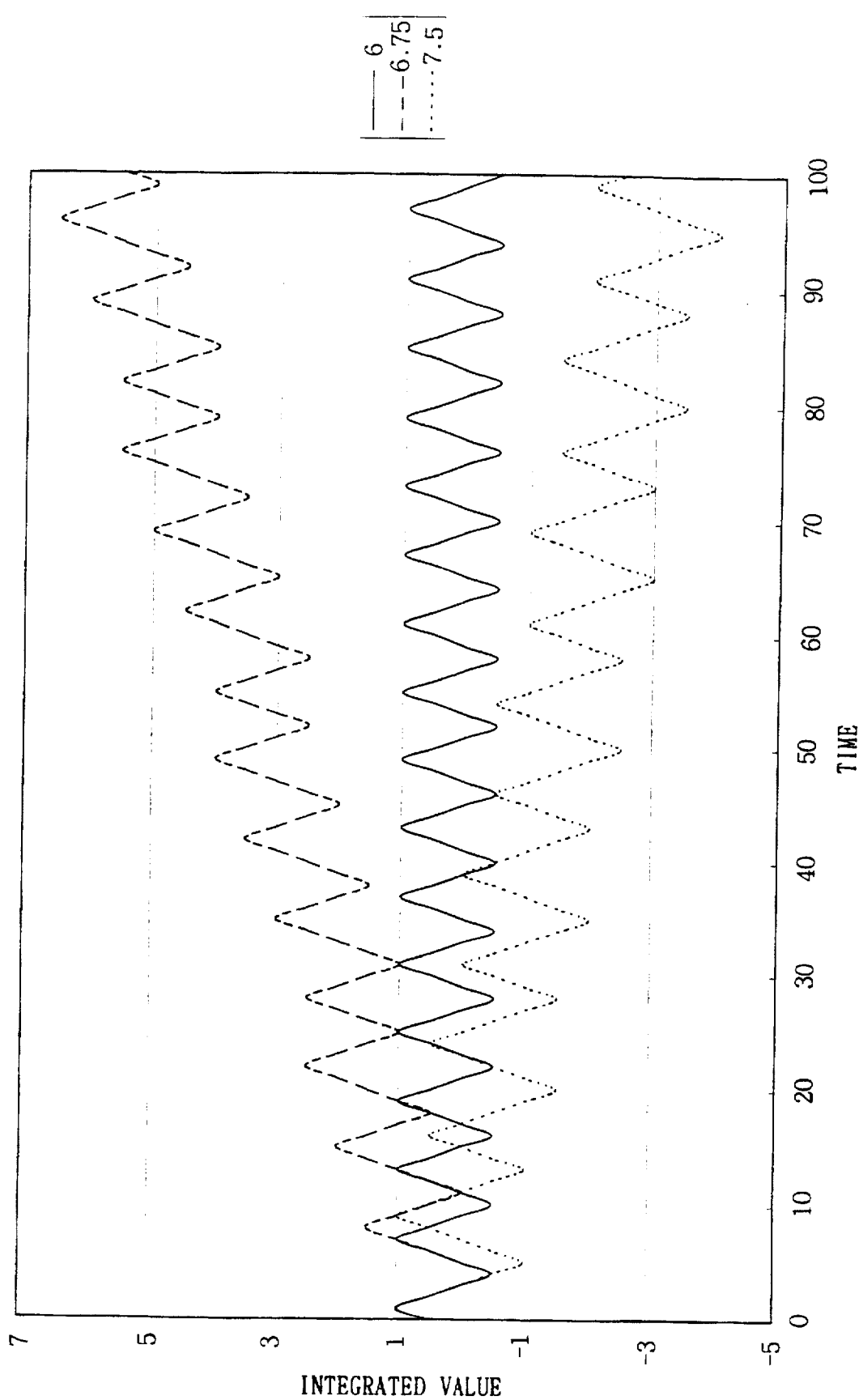
FIG. 15 is a characteristic curvilinear diagram showing the integrated value in the case of using the comparator.

Further, in the equation (3), FIGS. 14 and 15 show graphs of the integrated values of the amplitude limiter output and the comparator output, in which the offset voltage Vo is 0.1 same as the above case, and the period "T" of the input signal is changes by 0.3 from 6 to 7.5. As shown in FIG. 14, in the case of using the amplitude limiter, the integrated value is almost the same behavior regardless of the period of the input signal. On the contrary, as shown in FIG. 15, in the case of using the comparator, the integrated value varies according to the period of the input signal. It is understood from the result that, in the discrete time system, the signal binary coding circuit 30 shown in FIG. 10 cannot control the threshold correctly, but the signal binary coding circuit 20 can control the threshold correctly.

In order to accomplish this, first of all, sampling frequency is made higher than the reciprocal of the shortest inversion distance of polarity of the input signal. Thus, the signal inversion can be distinguished correctly. Then, by making the amplitude limit value as small as possible on one hand, the effects of signal asymmetry due to the symmetric factor can be prevented. On the other hand, by making the amplitude limit value larger to a certain extent, the sampled value that cannot be amplitude-limited in the neighborhood of polarity inversion can be existed regardless of the sampling phase.

Figure 12:
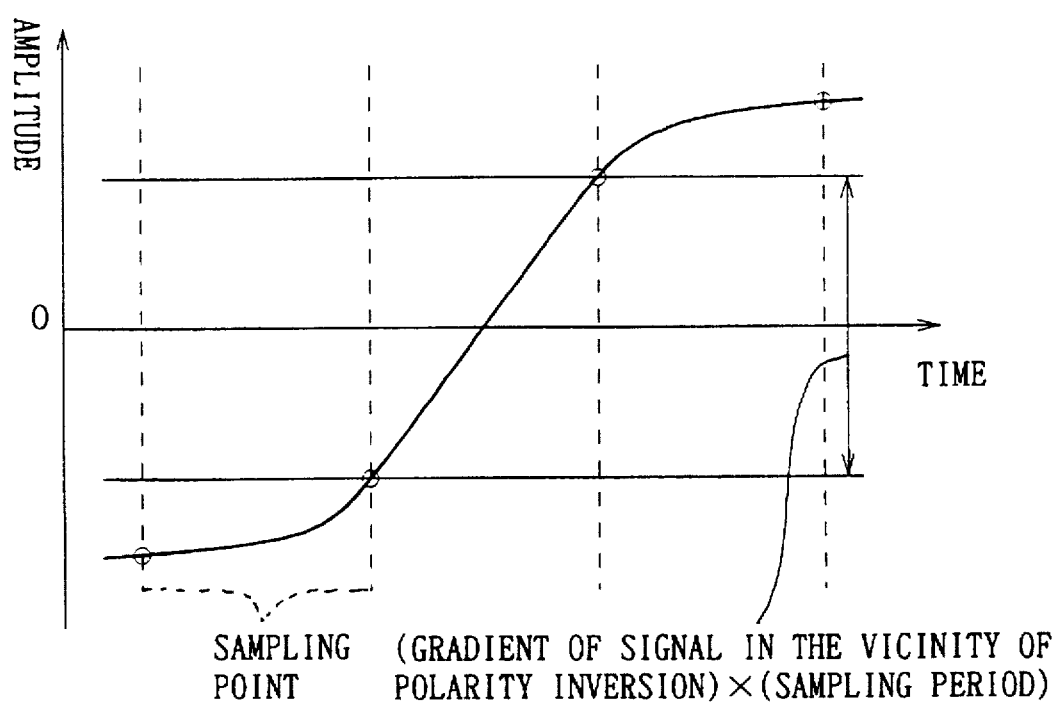
FIG. 12 is a characteristic curvilinear diagram showing the amplitude limit value of reproduction signal and the condition of sampling period.

At this point, in order to satisfy the latter condition, considering the case where sampling points exist on the positions separated the same distance forward and backward respectively from a point at which the input signal crosses zero level and in order that the sampled value would not be amplitude-limited, it is required to satisfy the following equation (4) (FIG. 12):

(amplitude limit value)>(the gradient of the signal in the vicinity of polarity inversion)×(sampling period)/2   (4)

Thereby, at least, one sampled value which cannot be amplitude-limited in the vicinity of polarity inversion exists regardless of the sampling phase.

The signal in which the accumulated DSV is controlled to approach to zero as close as possible does not contain direct current component. Besides, by adding the control as described above to the sampling frequency and the amplitude limit value, even in the case where the input is formed by sampled value line of the discrete time system, if distortion to bias direct current components between the recording system and the reproducing system will occur, since dead band does not occur and signals can be processed efficiently, the signal can be binary coded correctly by making the zero level as the threshold.

According to the foregoing construction, in the reproduction signal binary coding circuit 21 arranged in the digital signal processing apparatus 20, the amplitude limiting circuit 24 is connected in the control loop, and making the zero level as the threshold and by operating the reproduction signal binary coding circuit 21 within the limit of satisfying the condition that the amplitude limitation of the amplitude limiting circuit 24 is over (the gradient of the signal in the vicinity of polarity inversion)×(sampling period)/2, it can cope with the discrete time system and can be digitized easily. Also by digitizing the reproduction signal binary coding circuit making use of these characteristics of discrete time system, problems such as offset and drift will not occur, the best performance can be obtained constantly without making any adjustments.

While in the aforesaid embodiment, the AD converter 22 is connected to the preceding stage of the reproduction signal binary coding circuit 21 and digitizes. However, the present invention is not limited to thereto and signal processing circuits before and after the reproduction signal binary coding circuit 21 can be digitized. In this case, the whole system can be integrated to one integrated circuit and thus contributing to the reduction of the number of parts of the whole digital signal processing apparatus and lowering the price.

Furthermore, while in the aforesaid embodiment, the reproduction signal binary coding circuit 21 connected with the integrator 10 is utilized. However, the present invention is not limited to thereto and an incomplete integration circuit having the first pole in the low band, i.e., the primary low-pass filter can be used substituting for the integrator 10. In this case, the gain for direct current component of the system will be limited to finite values and the direct current value obtained has steady deviation, but instead, the possibility of saturation of the integrated value decreases.

Moreover, while in the aforesaid embodiment, the comparator 25 is provided in order to obtain the actual binary output. The present invention is not limited to thereto and the comparator 25 can be omitted since in many cases the highest level bit is made as the code bit in the signal expression method of the general digital signal processing. The highest level bit of output of the subtracter 23 can be only outputted to the output terminal 12.

Furthermore, while in the aforesaid embodiment, the signal from the optical pickup 3 is sampled by the AD converter 22 with the fixed sampling frequency and is output to the input terminal 6 of the reproduction signal binary coding circuit 21. However, the present invention is not limited thereto and the signal can be processed through such as the waveform equalization during the period when it is sampled by the sampling AD converter 22 till it reaches to the input terminal 6.

Moreover, while in the aforesaid embodiment, the reproduction signal binary coding circuit 21 of the digital signal processing apparatus can reproduce the optical disc 4. However, the present invention is not limited thereto and the reproducing apparatus and the recording/reproducing apparatus for binary coding the reproduction signal formed of digital signal can be applied so long as the apparatus in which the reproduction RF signal modulated by the method that the accumulated DSV approaches zero, such as DVD (digital video disc) and optical card, optical tape, optical disc, magneto-optical disc and magnetic disc in addition to the apparatus for reproducing optical disc 4.

As described above, according to the present invention, a subtracter circuit for subtracting direct current components from the sampled value input, a comparator circuit for comparing the output value of said subtracting circuit and the threshold and outputting binary signal depending upon said comparison value, an amplitude limiting circuit for amplitude-limiting the output value of the subtracting circuit with the fixed value, and a direct current component forming circuit for calculating direct current components from the output value of the amplitude limiting circuit are provided and thereby the signal binary coding circuit and recording medium reproducing apparatus capable of binary coding efficiently the input signal sampled by the discrete time can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An apparatus for processing a digital signal modulated so that the direct current component of the binary signal is almost zero, comprising:

amplitude limiting means for amplitude-limiting an input signal at a predetermined value;

direct current component forming means for extracting one or more direct current components from the output of said amplitude limiting means; and binary coding means for binary-coding said input signal based on the value of one or more of said direct current components.

2. The apparatus according to claim 1, wherein said binary coding means comprises:
subtracting means for subtracting one or more of said direct current components from said input signal; and
comparing means for comparing the output of said subtracting means with a threshold.

3. The apparatus according to claim 2, wherein
said amplitude limiting means wherein a limit value is set so that at least, one sampled value which can not amplitude-limited in the vicinity of polarity inversion exists.

4. The apparatus according to claim 3, wherein:
said threshold is zero; and
said amplitude limitation is over (the gradient of the signal in the vicinity of polarity inversion)×(sampling period)/2.

5. The apparatus according to claim 3, wherein
said amplitude limiting means has the input/output characteristic that the output value is symmetry with the input value.

6. The apparatus according to claim 4, wherein
said direct current component forming means is comprised of a low-pass filter.

7. The apparatus according to claim 3, wherein
said input signal is recorded by the NRZI.

8. The apparatus according to claim 7, wherein
said input signal is modulated by eight to fourteen modulation (EFM).

9. A binary coding circuit for binary-coding a digital signal modulated so that the direct current component of the binary signal is almost zero, comprising:
amplitude limiting means for amplitude-limiting an input signal at a predetermined value;
direct current component forming means for extracting one or more direct current components from the output of said amplitude limiting means; and
binary coding means for binary-coding said input signal based on the value of one or more of said direct current components.

10. The binary coding circuit according to claim 9, wherein said binary coding means comprises:
subtracting means for subtracting one or more of said direct current components from said input signal; and
comparing means for comparing the output of said subtracting means with a threshold.

11. The binary coding circuit according to claim 10, wherein
said amplitude limiting means wherein a limit value is set so that at least, one sampled value which can not be amplitude-limited in the vicinity of polarity inversion exists.

12. The binary coding circuit according to claim 11, wherein:
said threshold is zero; and
said amplitude limitation is over (the gradient of the signal in the vicinity of polarity inversion)×(sampling period)/2.

13. The binary coding circuit according to claim 11, wherein
said amplitude limiting means has the input/output characteristic that the output value is symmetry with the input value.

14. The binary coding circuit according to claim 12, wherein
said direct current component forming means is comprised of a low-pass filter.

15. The binary coding circuit according to claim 11, wherein
said input signal is recorded by the NRZI.

16. The binary coding circuit according to claim 15, wherein
said input signal is modulated by eight to fourteen modulation (EFM).

17. A method of processing a digital signal modulated so that the direct current component of the binary signal is almost zero, comprising the steps of:
amplitude-limiting an input signal at a predetermined value;
extracting one or more direct current components from the amplitude-limited input signal; and
binary coding said input signal based on the value of one or more of said extracted direct current components.

18. The method according to claim 17, wherein said binary coding step comprises the steps of:
subtracting one or more of said direct current components from said input signal to generate a difference signal; and
comparing said difference signal with a threshold.

19. The method according to claim 18, wherein
amplitude limiting step limites the amplitude so that at least, one sampled value which can not be amplitude-limited in the vicinity of polarity inversion exists.

20. The method according to claim 19, wherein:
said threshold is zero; and
said amplitude limitation is over (the gradient of the signal in the vicinity of polarity inversion)×(sampling period)/2.

21. An apparatus for processing a digital signal modulated so that the direct current component of the binary signal is almost zero, comprising:
amplitude limiting means for amplitude-limiting an input signal at a predetermined value, wherein a limit value is set so that at least one sampled value which can not be amplitude limited in the vicinity of polarity inversion exists;
direct current component forming means for extracting a direct current component from the output of said amplitude limiting means;
subtracting means for subtracting said direct current component from said input signal; and
comparing means for comparing the output of said subtracting means with a threshold.

22. The apparatus according to claim 21, wherein:
said threshold is zero; and
said amplitude limitation is greater than one-half the product of the gradient of the signal in the vicinity of polarity inversion and the sampling period.

23. The apparatus according to claim 21, wherein
said amplitude limiting means has an input/output characteristic that the output value is symmetrical with the input value.

24. The apparatus according to claim 22, wherein
said direct current component forming means is comprised of a low-pass filter.

25. The apparatus according to claim 21, wherein
said input signal is recorded in non-return-to-zero-invert (NRZI) format.

26. The apparatus according to claim 25, wherein
said input signal is modulated by eight to fourteen modulation (EFM).

27. A binary coding circuit for binary-coding a digital signal modulated so that the direct current component of the binary signal is almost zero, comprising:
amplitude limiting means for amplitude-limiting an input value at a predetermined value, wherein a limit value is set so that at least one sampled value which can not be amplitude-limited in the vicinity of polarity inversion exists;
direct current component means for extracting a direct current component from the output of said amplitude limiting means;
subtracting means for subtracting said direct current component from said input signal; and
comparing means for comparing the output of said subtracting means with a threshold.

28. The binary coding circuit according to claim 27, wherein:
said threshold is zero; and
said amplitude limitation is greater than one-half the product of the gradient of the signal in the vicinity of polarity inversion and the sampling period.

29. The binary coding circuit according to claim 27, wherein
said amplitude limiting means has an input/output characteristic that the output value is symmetrical with the input value.

30. The binary coding circuit according to claim 28, wherein
said direct current component forming means is comprised of a low-pass filter.

31. The binary coding circuit according to claim 27, wherein
said input signal is recorded in non-return-to-zero-invert (NRZI) format.

32. The binary coding circuit according to claim 31, wherein
said input signal is modulated by eight to fourteen modulation (EFM).

33. A method of processing a digital signal modulated so that the direct current component of the binary signal is almost zero, comprising the steps of:
amplitude-limiting an input signal at a predetermined value such that at least one sampled value which can not be amplitude-limited in the vicinity of polarity inversion exists;
extracting a direct current component from the amplitude-limited input signal;
subtracting said direct current component from said input signal to generate a difference signal; and
comparing said difference signal with a threshold.

34. The method according to claim 33, wherein:
said threshold is zero; and
said amplitude limitation is greater than one-half the product of the gradient of the signal in the vicinity of polarity inversion and the sampling period.

* * * * *